United States Patent
Elkenkamp (12) 
(10) Patent No.: US 9,499,141 B1
(45) Date of Patent: Nov. 22, 2016

(54) SENSOR-TRIGGERING OF FRICTION AND REGENERATIVE BRAKING

(71) Applicant: Faraday & Future Inc., Gardena, CA (US)

(72) Inventor: Marco Elkenkamp, Marina Del Rey, CA (US)

(73) Assignee: Faraday & Future Inc., Gardena, CA (US)

(*) Notice: Subject to any disclaimer, the term of this patent is extended or adjusted under 35 U.S.C. 154(b) by 0 days.

(21) Appl. No.: 14/869,239

(22) Filed: Sep. 29, 2015

(51) Int. Cl.
| G06F 7/70 | (2006.01) |
| G06F 19/00 | (2011.01) |
| G06G 7/00 | (2006.01) |
| G06G 7/76 | (2006.01) |
| B60T 7/22 | (2006.01) |
| B60T 7/04 | (2006.01) |
| B60T 8/171 | (2006.01) |

(52) U.S. Cl.
CPC .................. B60T 7/22 (2013.01); B60T 7/042 (2013.01); B60T 8/171 (2013.01); *B60T 2201/022* (2013.01); *B60T 2220/04* (2013.01); *B60T 2270/604* (2013.01)

(58) Field of Classification Search
CPC ...... B60T 7/042; B60T 8/171; B60T 8/1755; B60T 8/172; B60T 7/22; B60W 10/184; B60W 10/18

USPC .......................................................... 701/70
See application file for complete search history.

(56) References Cited

U.S. PATENT DOCUMENTS 6,226,389 B1     5/2001   Lemelson et al.
2014/0324316 A1   10/2014   Yao et al.

FOREIGN PATENT DOCUMENTS

| DE | 10 2013 108000 A1 | 1/2014 |
| EP | 1839985 A2 | 10/2007 |
| EP | 2460701 A2 | 6/2012 |
| EP | 2463165 A1 | 1/2013 |
| WO | WO 03/006291 A1 | 1/2003 |
| WO | WO 2015/114430 A1 | 8/2015 |

OTHER PUBLICATIONS

International Search Report and Written Opinion in International Application No. PCT/US2015/067105, mailed on Jun. 13, 2016.

*Primary Examiner* — Maceeh Anwari
(74) *Attorney, Agent, or Firm* — Knobbe Martens Olson & Bear LLP (57) ABSTRACT

In an emergency stop situation, the regenerative braking system is used to assist in rapid deceleration, by combining regenerative braking with conventional friction brakes. Sensors can also be used to trigger the braking systems, even before the driver is able to react. These sensors might include external cameras, ABS activation detection, radar and ultrasound.

17 Claims, 7 Drawing Sheets

SENSOR-TRIGGERING OF FRICTION AND REGENERATIVE BRAKING

FIELD OF THE DISCLOSURE

The present disclosure relates generally to the field of vehicle systems, and more specifically to systems and methods for vehicle braking systems.

BACKGROUND

Many types of vehicles currently employ regenerative braking systems in combination with conventional friction braking systems. Electric trains have used such systems for many years, and the more recent advent of hybrid and electric automobiles, trucks and buses has expanded the use of these dual braking systems. Even certain race cars are equipped with dual braking systems, most notably the kinetic energy recovery systems used in Formula One.

SUMMARY

The present application is directed to methods for automatically activating simultaneously a friction braking system and a regenerative braking system of a vehicle. In an exemplary method, a position and movement of one or more objects can be detected in the surroundings of a vehicle. An operation of a brake pedal of the vehicle can be detected. A risk of collision of the vehicle with the one or more objects based upon the position and the movement of the one or more objects can be calculated. The calculated risk of collision can represent a probability that a collision of the vehicle with the one or more objects is unavoidable without an immediate intervention of the friction braking system and the regenerative braking system. In response to the brake pedal being operated with an operating speed exceeding a predetermined operating speed, or the calculated risk of collision exceeding a predetermined risk of collision, the friction braking system and the regenerative braking system of the vehicle can be automatically and simultaneously activated.

According to additional exemplary embodiments, the present application can be directed to methods for automatically activating simultaneously a friction braking system and a regenerative braking system of a vehicle. In an exemplary method, a position and movement of one or more objects can be detected in the surroundings of a vehicle. An operation of a brake pedal of the vehicle can be detected. A risk of collision of the vehicle with the one or more objects based upon analyzing 2-dimensional or 3-dimensional vectors representing the velocity and direction of the vehicle and the one or more objects can be calculated. The calculated risk of collision can represent a probability that, based on the vector analysis, the vehicle and the one or more objects will reach a point in space at approximately the same time without an immediate intervention of the friction braking system and the regenerative braking system. In response to the brake pedal being operated with an operating speed exceeding a predetermined operating speed, or the calculated risk of collision exceeding a predetermined risk of collision, the friction braking system and the regenerative braking system of the vehicle can be automatically and simultaneously activated.

According to further exemplary embodiments, the present application can be directed to systems for automatically activating simultaneously a friction braking system and a regenerative braking system of a vehicle. An exemplary system can comprise a first sensor on the vehicle to detect a position and movement of one or more objects in surroundings of a vehicle. A second sensor on the vehicle can detect operation of a brake pedal of the vehicle. The system can further comprise a regenerative braking system and a friction braking system of the vehicle. Additionally, the system can comprise a system controller on the vehicle communicatively coupled to the first sensor, the second sensor, the regenerative braking system and the friction braking system. The system controller can be configured to calculate a risk of collision of the vehicle with the one or more objects based upon the position and the movement of the one or more objects. In response to the brake pedal being operated with an operating speed exceeding a predetermined operating speed, or the calculated risk of collision exceeding a predetermined risk of collision, the system controller can automatically activate simultaneously the friction braking system and the regenerative braking system of the vehicle.

DETAILED DESCRIPTION

Regenerative braking systems use a mechanism to convert a portion of the kinetic energy of a moving vehicle into a usable form of energy. In contrast, kinetic energy is lost as heat in friction braking systems. Most regenerative braking systems use an electric motor as a generator to convert the kinetic energy into electric energy that can be recovered to the power grid (for electric trains), consumed immediately by other electric components on the vehicle, or stored in batteries or capacitors. Other systems can use a flywheel to store the recovered energy.

Regenerative braking systems are actuated when the vehicle operator presses the brake pedal. Systems within the vehicle determine the amount of frictional braking and the amount of regenerative braking that will be used at any given time.

The present disclosure is directed to systems and methods for automatically activating simultaneously a friction braking system and a regenerative braking system of a vehicle.

Vehicles equipped with both friction and regenerative braking systems can have a high level of braking capacity when considering the maximum amount of braking each system can provide. However, on-board computer systems typically allow only a portion of the maximum regenerative braking capacity to be used for a variety of safety and other concerns. One situation which can be well defined where total or near total regenerative braking can be used is when the vehicle is about to be involved in a collision with another vehicle or a fixed object, and full use of the regenerative braking system along with the friction braking system can bring the vehicle to a stop before the collision occurs. Without the full use of the regenerative braking system, it may not be possible to avoid the collision in many circumstances. Current vehicle systems cannot provide the on-board computer systems with the information necessary to ascertain that a collision is imminent if some action is not taken and the engage the full or near full capacity of the regenerative braking system regardless of the brake pedal input provided by a vehicle operator.

Figure 1:
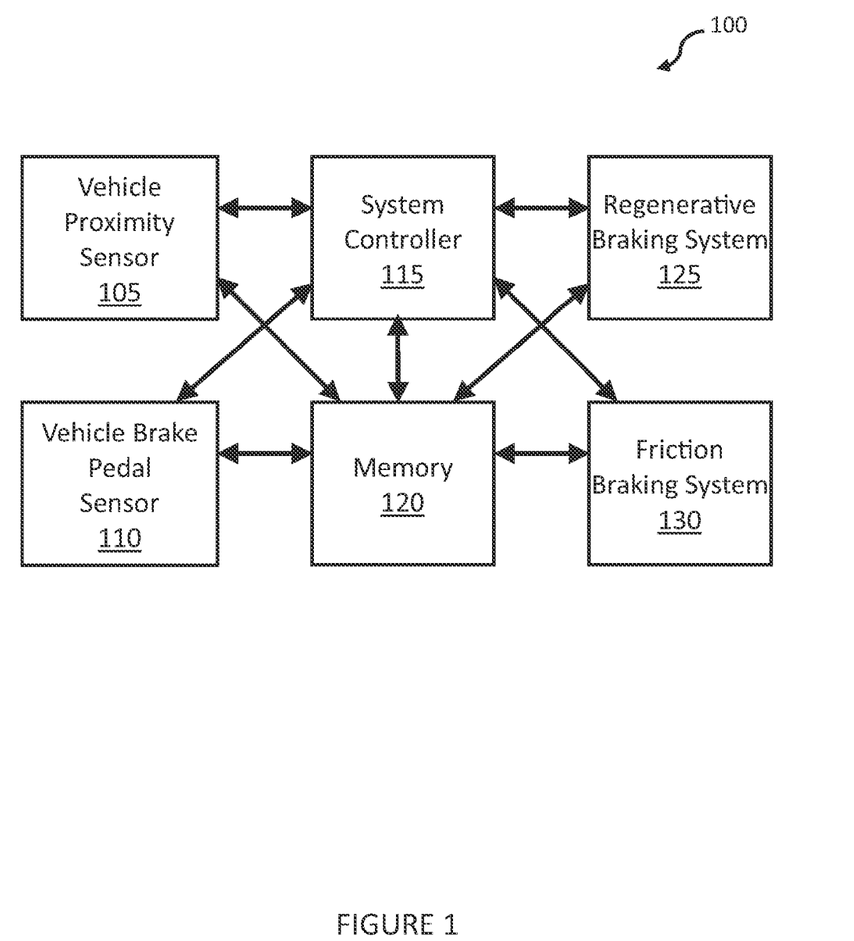
FIG. 1 is a schematic diagram of a system for automatically activating simultaneously a friction braking system and a regenerative braking system of a vehicle according to various embodiments.
Figure 2:
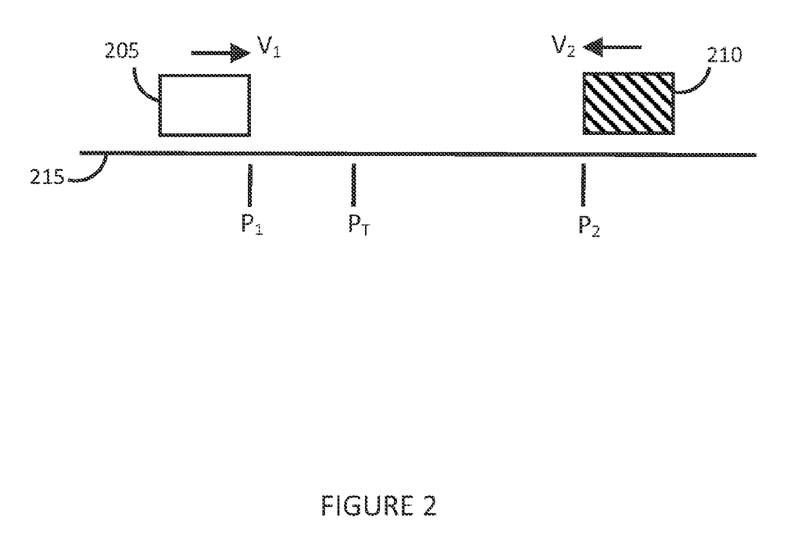
FIG. 2 is a graphical 1-dimensional representation of a vehicle and one or more objects on a collision course according to various embodiments.

The situational and location information needed by the vehicle systems to determine when full regenerative braking can be used can be provided by one or more sensors. FIGS. 1 and 2 schematically illustrates various embodiments of a system 100 for automatically activating simultaneously a friction braking system 130 and a regenerative braking system 125 of a vehicle 205 in a collision situation with one or more objects 210 in surroundings of the vehicle 205. The one or more objects 210 can be moving or fixed. The vehicle 205 can be equipped with one or more vehicle proximity sensors 105 to locate and characterize movement of one or more objects 210 in the surroundings of the vehicle 205. The proximity sensors 105 can comprise one or more of a video sensor, a radar sensor, a lidar sensor, a sonar sensor, an ultrasound sensor, a microwave sensor, a light sensor, a sound sensor, or any other suitable sensor as is known in the art. The vehicle 205 can also be equipped with one or more brake pedal actuation sensors 110 that can be capable of sensing brake actuation by the vehicle operator as well as the level of actuation (e.g., how hard the operator is pressing the brake pedal). In addition, the vehicle 205 can be equipped with other sensors (not shown) to sense conditions of the vehicle itself and vehicle subsystems such as but not limited to a speed sensor, a wheel rotation sensor, a steering position sensor, an anti-lock braking system sensor, engine sensors, electrical system sensors, fuel distribution system sensors; and the like.

The vehicle proximity sensor 105 and the vehicle brake pedal sensor 110 can be communicatively coupled to a system controller 115 and a memory 120. Additionally, the system controller 115 and the memory 120 can be communicatively coupled to one another. The system controller 115 can receive input from the vehicle proximity sensor 105 and the vehicle brake pedal sensor 110 and control operation of the regenerative braking system 125 and the friction braking system 130 of the vehicle 205. The regenerative braking system 125 and the friction braking system 130 can be communicatively coupled to the system controller 115 and the memory 120. The system controller 115, according to various embodiments, can comprise a specialized chip, such as an application-specific integrated circuit (ASIC) chip, programmed with logic as described herein to operate the elements of the system 100. The programmed logic can comprise instructions for automatically activating simultaneously the friction braking system 130 and the regenerative braking system 125 of the vehicle 205 in a collision situation with one or more objects 210 in surroundings of the vehicle 205 in response to one or more inputs.

FIG. 2 along with FIG. 1 illustrate operation of various embodiments of the system 100 for the most basic 1-dimensional situation in which two objects can be on a collision course. As the moving vehicle 205 travels along a roadway 215 at a velocity of $V_1$ and position $P_1$, the vehicle proximity sensor 105 can sense that the one or more objects 210 are also on the roadway 215 at position $P_2$ and moving at a velocity of $V_2$. The vehicle proximity sensor 105 can communicate this information to the system controller 115. The vehicle brake pedal sensor 110 can also sense whether the vehicle operator has actuated the brake pedal and the extent of the actuation and communicate this information to the system controller 115. The system controller 115 can use the communicated information (e.g., $V_1$, $P_1$, $V_2$, $P_2$, vehicle brake pedal sensor 110 data, and any other applicable sensed data) to calculate a risk of collision (occurring at a terminal position $P_T$) between the vehicle 205 and the one or more objects 210. That is, the system controller 115 can determine the closest proximity of the vehicle 205 and the one or more objects 210 given the current sensed data. The calculated risk of collision can be the probability that a collision between the vehicle 205 and the one or more objects 210 is unavoidable without an immediate intervention of the friction braking system 130 and the regenerative braking system 125. The system controller 115 can also evaluate a current operating speed of the vehicle 205 and determined whether the friction braking system 130 alone is adequate to slow or stop the vehicle 205 and avoid the collision by calculating a rate of deceleration of the vehicle 205 when using only the friction braking system 130. The system controller 115 can also determine a rate of deceleration when using both the friction braking system 130 and the regenerative braking system 125. If the calculated risk of collision exceeds a predetermined level or the operating speed exceeds a predetermined level in which a collision cannot be avoided using the friction braking system 130 alone, the system controller 115 can automatically and simultaneously activate both the friction braking system 130 and the regenerative braking system 125 of the vehicle 205. When so activated, the system controller 115 can call upon any amount of braking capacity up to the full braking capacity of the friction braking system 130 and the regenerative braking system 125 independently. For example, the system controller 115 can determine that the necessary braking capacity to avoid the collision is 100 percent of the friction braking system and 60 percent of the regenerative braking system 125, and then actuate that level of braking. In various embodiments, the amount of braking force obtained from the friction braking system 130 and the regenerative braking system 125 can be independent of the amount of force applied to the brake pedal by the vehicle operator.

Figure 3:
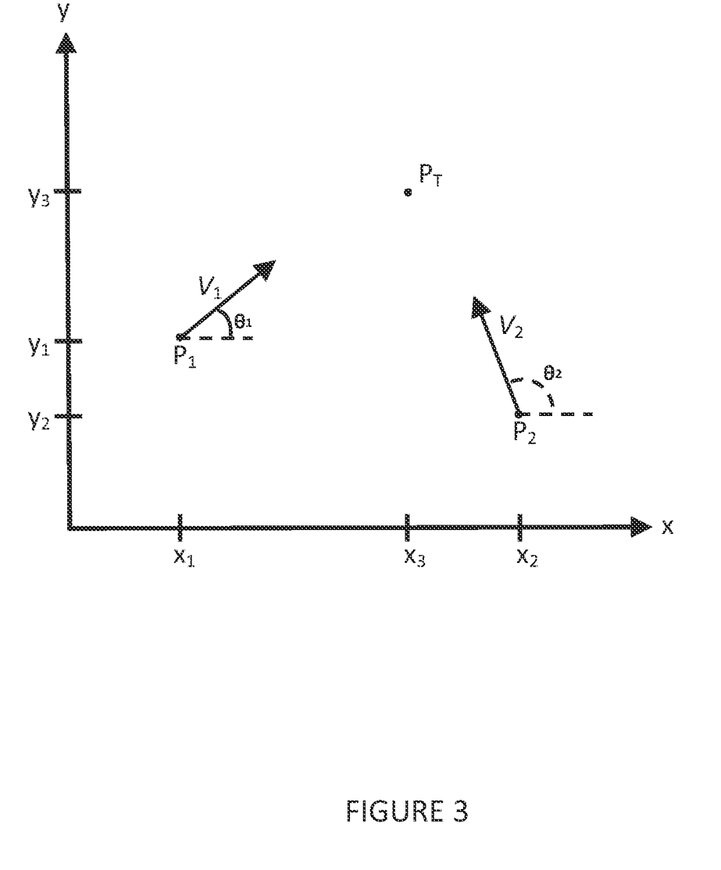
FIG. 3 is a graphical 2-dimensional representation of a vehicle and one or more objects on a collision course according to various embodiments.

FIG. 3 illustrates operation of various embodiments of the system 100 that can approximate the movement of ground-based vehicles such as automobiles, buses, trucks, trains, and the like moving within a 2-dimensional space (not taking into account the 3-dimensionality introduced by overpasses). In the 2-dimensional case, velocity and initial position alone are not adequate to calculate the risk of collision; a vector analysis can now be required. In FIG. 3, the vehicle 205 is initially at position $P_1$ at coordinates ($x_1$, $y_1$) and moving according to vector $V_1$ that is oriented at an angle $\theta_1$ with respect to the x-axis. The one or more objects 210 is initially at position $P_2$ at coordinates ($x_2$, $y_2$) and moving according to vector $V_2$ that is oriented at an angle $\theta_2$ with respect to the x-axis. A vector analysis can be used to determine whether there is a terminal position $P_T$ at coordinates $(x_3, y_3)$ at which the vehicle 205 and the one or more objects 210 will collide, as well as to determine whether to automatically and simultaneously activate the friction braking system 130 and the regenerative braking system 125 as described previously.

Figure 4:
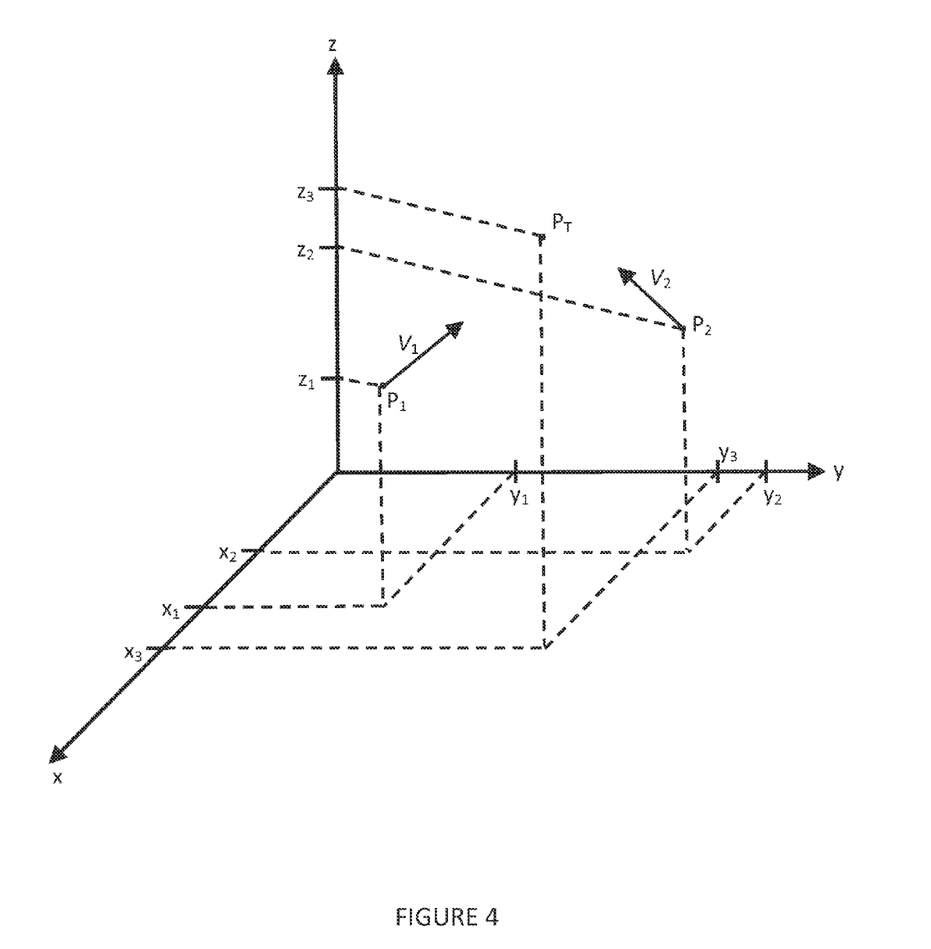
FIG. 4 is a graphical 3-dimensional representation of a vehicle and one or more objects on a collision course according to various embodiments.

Turning now to FIG. 4, the operation of various embodiments of the system 100 for airborne vehicles 205 such as airplanes, helicopters, gliders, blimps, balloons, and drones that operate in a 3-dimensional space can be approximated. The 3-dimensional aspect of the movement of these vehicles 205 can also necessitate a vector analysis. As illustrated in FIG. 4 according to various embodiments, the vehicle 205 is initially at position $P_1$ at coordinates $(x_1, y_1, z_1)$ and moving according to vector $V_1$. The one or more objects 210 is initially at position $P_2$ at coordinates $(x_2, y_2, z_2)$ and moving according to vector $V_2$ (the angle of orientation of the vectors $V_1$ and $V_2$ with respect to the x-, y- and z-axis is not shown in FIG. 4 for simplicity). A vector analysis can be used to determine whether there is a terminal position $P_T$ at coordinates $(x_3, y_3, z_3)$ at which the vehicle 205 and the one or more objects 210 will collide, as well as to determine whether to automatically and simultaneously activate the friction braking system 130 and the regenerative braking system 125 as described previously.

Figure 5:
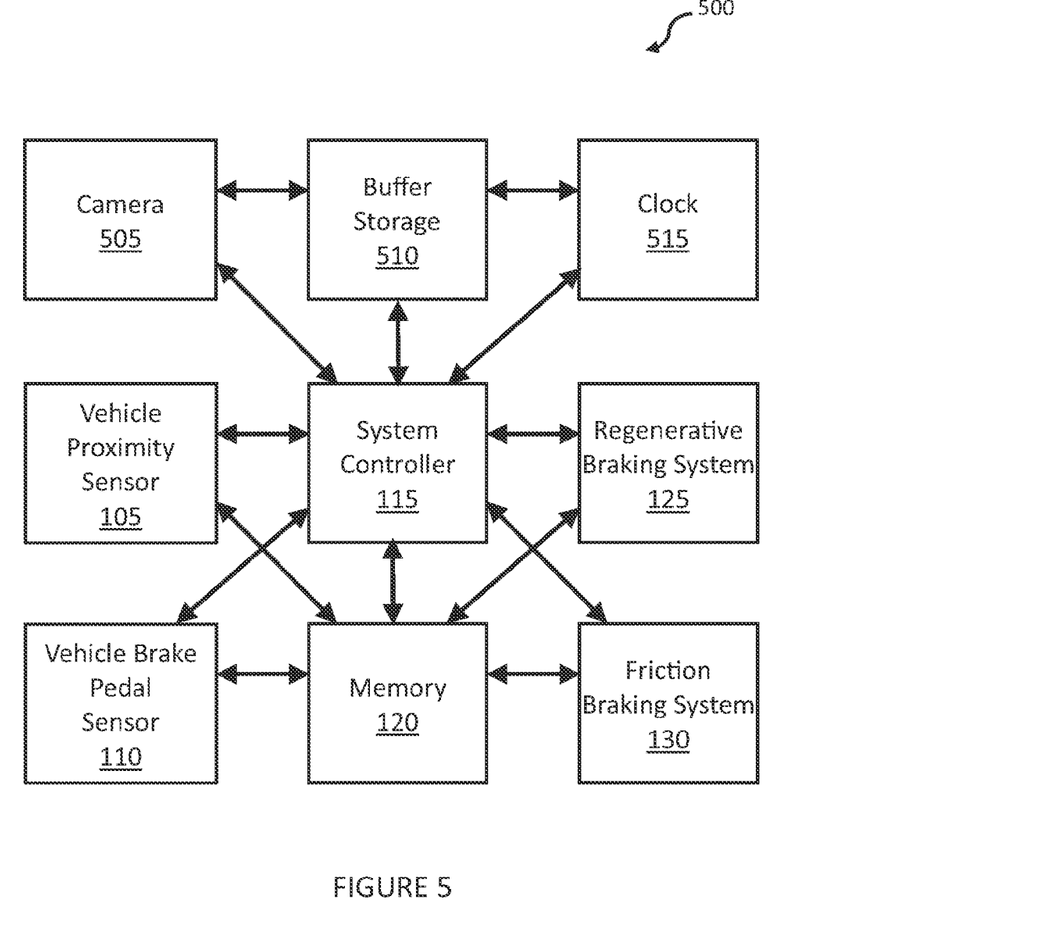
FIG. 5 is a schematic diagram of a system for automatically activating simultaneously a friction braking system and a regenerative braking system of a vehicle according to various embodiments.

FIG. 5 illustrates a system 500 according to certain embodiments that incorporates a camera 505, a buffer storage 510 and a clock 515 to the system 100 of FIG. 1. The camera 505 can produce a video stream (either continuously or intermittently). A portion of the video stream can be temporarily retained in the buffer storage 510. The portion of the video stream retained in the buffer storage 510 can be defined by a period of time. For example, the buffer storage 510 can retain the most recent 10 minutes of the video stream. As is apparent to one skilled in the art, the period of time can be any length of time greater than or less than 10 minutes and can be limited only by the amount (e.g., measured in gigabytes) of buffer storage available. The vehicle proximity sensor 105 can be in communication with the system controller 115. When the vehicle proximity sensor 105 senses a situation as described previously in which the system controller 115 automatically and simultaneously activates the friction braking system 130 and the regenerative braking system 125, the vehicle proximity sensor 105 can communicate with the system controller 115, which in turn communicates with the buffer storage 510. A portion of the video stream related to the braking activation can be stored in the memory 120. The clock 515 can be a real time clock for providing time stamp data for the video stream and the data received from the vehicle proximity sensor 105 and the vehicle brake pedal sensor 110.

Once the vehicle proximity sensor 105 communicates that the one or more objects 210 are in the surroundings of the vehicle 205, a portion of the video stream retained in the buffer storage 510 can be directed to the memory 120. The retained portion of the video stream 110 can be defined to start at a first predefined time and end at a second predefined time. The start time can be selected to be a predetermined amount of time prior to the time at which the vehicle proximity sensor 105 sensed the one or more objects 210. For example the start time can be selected to be 30 seconds prior to the time the one or more objects 210 were sensed. Thus, the retained portion of the video stream can capture the circumstances leading up to the potential collision and can record the circumstances leading to the potential collision and the circumstances after the collision is avoided. The end time can be any desired period of time after the time the one or more objects 210 were sensed.

In addition, the memory 120 or system controller 115 can store various non-video data including but not limited to one or more time stamps for first and second predefined times and the time the one or more objects 210 were sensed, identifier of the sensor 105, 110 providing data to the system controller 115, identifier of the vehicle 205, identifier of the vehicle operator, vehicle service history, status of other vehicle sensors that sense conditions of the vehicle 205 itself and vehicle subsystems such as engine, electrical, and fuel distribution, and the like.

The system controller 115, according to some exemplary embodiments, is a non-generic computing device comprising non-generic computing components. The system controller 115 can comprise dedicated hardware processors to determine, transmit, and receive video and non-video data elements. In further exemplary embodiments, the system controller 115 comprises a specialized device having circuitry and specialized hardware processors, and is artificially intelligent, including machine learning. Numerous determination steps by the system controller 115 as described herein can be made to video and non-video data by an automatic machine determination without human involvement, including being based on a previous outcome or feedback (e.g., automatic feedback loop) provided by the networked architecture, processing and/or execution as described herein.

Figure 6:
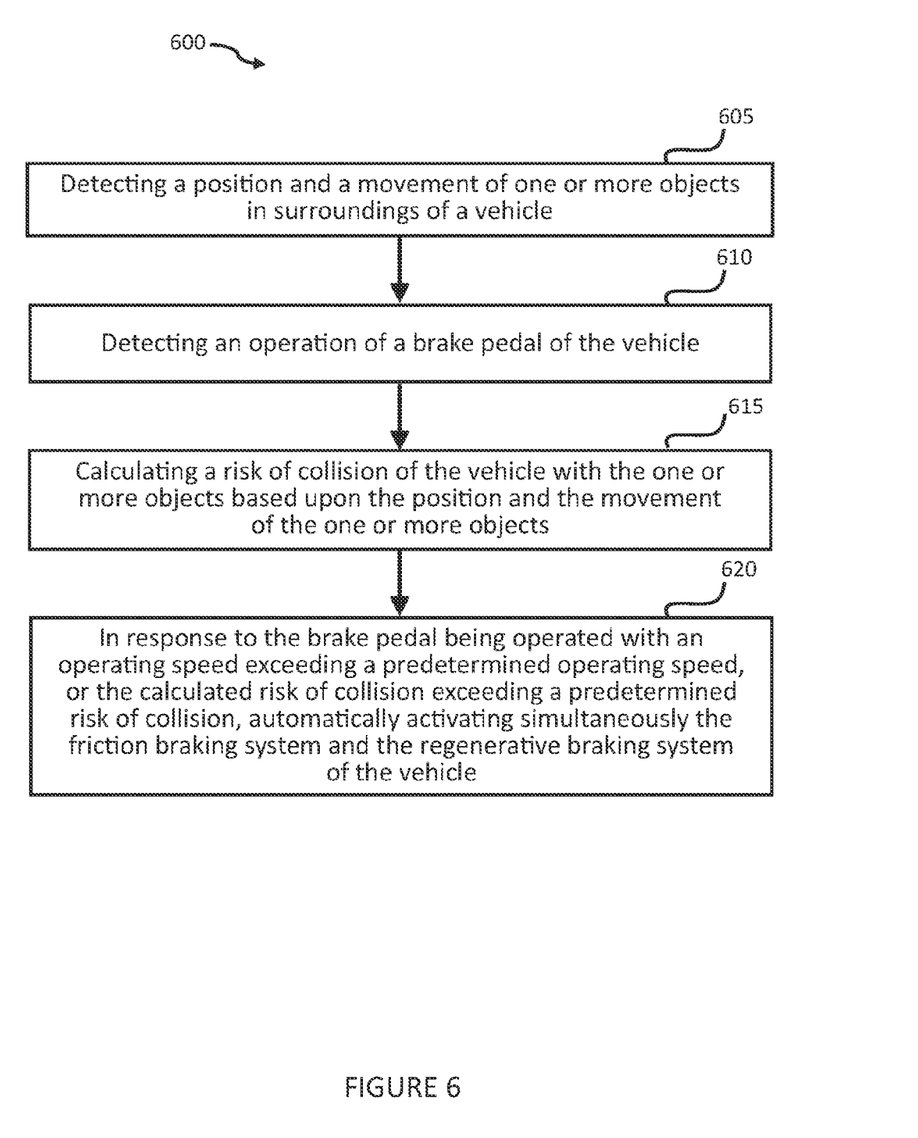
FIG. 6 is a flow diagram of an exemplary method for automatically activating simultaneously a friction braking system and a regenerative braking system of a vehicle according to various embodiments.

FIG. 6 is a flowchart of an exemplary method 600 for automatically activating simultaneously a friction braking system 130 and a regenerative braking system 125 of a vehicle 205. At step 605, as illustrated in FIG. 6 and FIGS. 1 and 2, a position and movement of one or more objects 210 can be detected in the surroundings of a vehicle 205. An operation of a brake pedal of the vehicle 205 can be detected at step 610. A risk of collision of the vehicle 205 with the one or more objects 210 based upon the position and the movement of the one or more objects 210 can be calculated at step 615. The calculated risk of collision can represent a probability that a collision of the vehicle 205 with the one or more objects 210 is unavoidable without an immediate intervention of the friction braking system 130 and the regenerative braking system 125. At step 620, in response to the brake pedal being operated with an operating speed exceeding a predetermined operating speed, or the calculated risk of collision exceeding a predetermined risk of collision, the friction braking system 130 and the regenerative braking system 125 of the vehicle 205 can be automatically and simultaneously activated.

Figure 7:
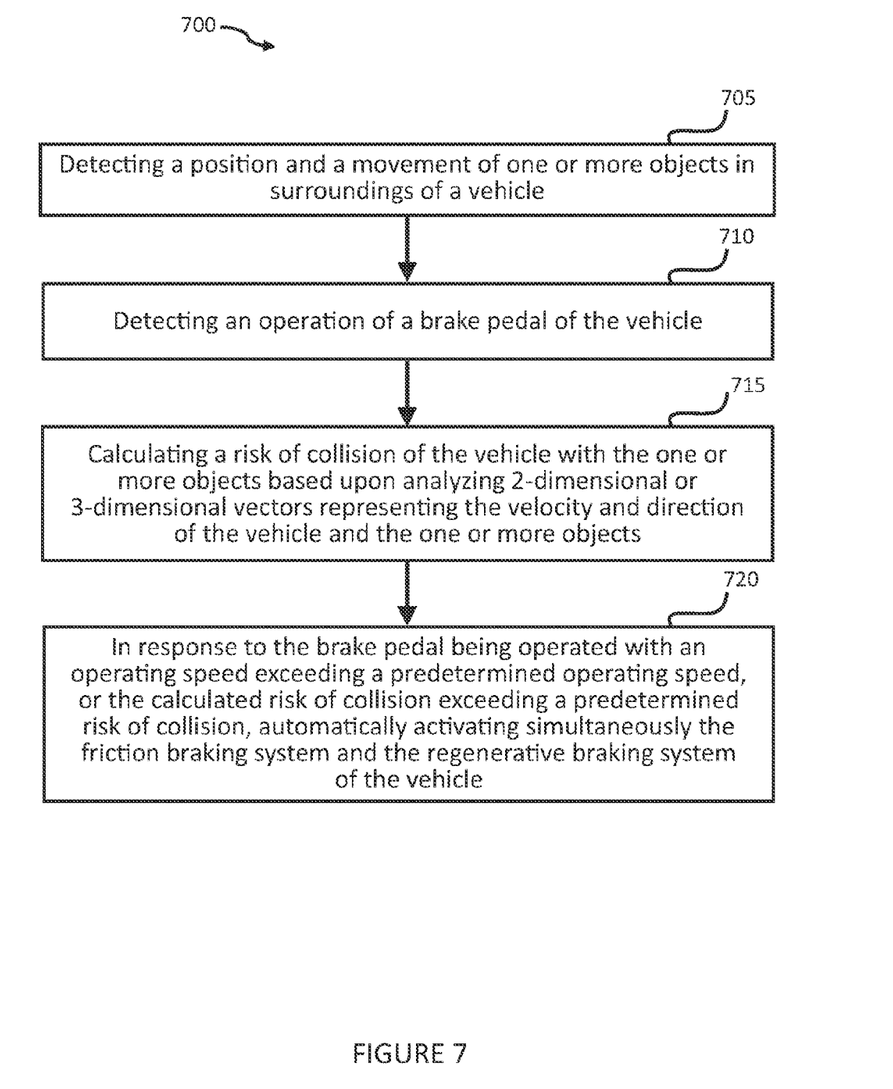
FIG. 7 is a flow diagram of an exemplary method for automatically activating simultaneously a friction braking system and a regenerative braking system of a vehicle according to various embodiments.

FIG. 7 is a flowchart of an exemplary method 700 for automatically activating simultaneously a friction braking system 130 and a regenerative braking system 125 of a vehicle 205. At step 705, as illustrated in FIG. 7 and FIGS. 1 through 4, a position and movement of one or more objects 210 can be detected in the surroundings of a vehicle 205. An operation of a brake pedal of the vehicle 205 can be detected at step 710. A risk of collision of the vehicle 205 with the one or more objects 210 based upon analyzing 2-dimensional or 3-dimensional vectors representing the velocity and direction of the vehicle 205 and the one or more objects 210 can be calculated at step 715. The calculated risk of collision can represent a probability that, based on the vector analysis, the vehicle 205 and the one or more objects 210 will reach a point in space at approximately the same time without an immediate intervention of the friction braking system 130 and the regenerative braking system 125. At step 720, in response to the brake pedal being operated with an operating speed exceeding a predetermined operating speed, or the calculated risk of collision exceeding a predetermined risk of collision, the friction braking system 130 and the regenerative braking system 125 of the vehicle 205 can be automatically and simultaneously activated.

Some of the above-described functions can be composed of instructions that are stored on storage media (e.g., computer-readable media). The instructions can be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media can be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While the present disclosure has been described in connection with a series of preferred embodiments, these descriptions are not intended to limit the scope of the disclosure to the particular forms set forth herein. The above description is illustrative and not restrictive. Many variations of the embodiments will become apparent to those of skill in the art upon review of this disclosure. The scope of this disclosure should, therefore, be determined not with reference to the above description, but instead should be determined with reference to the appended claims along with their full scope of equivalents. The present descriptions are intended to cover such alternatives, modifications, and equivalents as can be included within the spirit and scope of the disclosure as defined by the appended claims and otherwise appreciated by one of ordinary skill in the art. In several respects, embodiments of the present disclosure can act to close the loopholes in the current industry practices in which good business practices and logic are lacking because it is not feasible to implement with current resources and tools.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

What is claimed is:

1. A method for automatically activating simultaneously a friction braking system and a regenerative braking system of a vehicle, the method comprising the steps of:
   detecting a position and a movement of one or more objects in surroundings of a vehicle;
   detecting an operation of a brake pedal of the vehicle;
   calculating a risk of collision of the vehicle with the one or more objects based upon the position and the movement of the one or more objects, the calculated risk of collision representing a probability that a collision of the vehicle with the one or more objects is unavoidable without an immediate intervention of the friction braking system and the regenerative braking system;
   in response to the brake pedal being operated with an operating speed exceeding a predetermined operating speed, or the calculated risk of collision exceeding a predetermined risk of collision, automatically activating simultaneously the friction braking system and the regenerative braking system of the vehicle;
   receiving, from a camera on the vehicle, a continuous video stream into buffer storage;
   receiving, from a sensor on the vehicle, a signal to transfer the continuous video stream from the buffer storage to a memory, wherein receiving from the sensor on the vehicle a signal to transfer the continuous video stream comprises receiving a signal that the regenerative braking system has been automatically activated;
   receiving, from a system controller on the vehicle, a first predefined time, the first predefined time indicating a time prior to the receiving of the signal to transfer in which to initiate a transfer of the continuous video stream from the buffer storage to the memory;
   receiving, from the system controller on the vehicle, a second predefined time, the second predefined time indicating a time after the receiving of the signal to transfer in which to stop the transfer of the continuous video stream from the buffer storage to the memory; and
   saving the continuous video stream in the memory.

2. The method of claim 1, wherein detecting the position and movement of the one or more objects comprises detecting the position and movement of the one or more objects using at least one of video, radar, lidar, sonar, ultrasound, microwave, light, and sound.

3. The method of claim 1, wherein detecting the position and movement of one or more objects comprises detecting the position and movement of one or more vehicles.

4. The method of claim 1, wherein detecting the position and movement of one or more objects comprises detecting the position and movement of one or more fixed objects.

5. The method of claim 1, wherein detecting an operation of a brake pedal of the vehicle comprises receiving from a sensor by a system controller on the vehicle a signal indicating an amount of force applied to the brake pedal.

6. The method of claim 1, wherein automatically activating the regenerative braking system comprises activating the regenerative braking system to achieve a desired rate of deceleration independent of the amount of force applied to the brake pedal.

7. The method of claim 1, wherein calculating the risk of collision of the vehicle with the one or more objects comprises determining a speed and direction of the vehicle and a speed and direction of the one or more objects, and calculating a closest proximity of the vehicle and the one or more objects.

8. The method of claim 7, wherein calculating the risk of collision of the vehicle with the one or more objects further comprises determining a rate of deceleration of the vehicle when using only the friction braking system.

9. The method of claim 7, wherein calculating the risk of collision of the vehicle with the one or more objects further comprises determining a rate of deceleration of the vehicle when using both the friction braking system and the regenerative braking system.

10. The method of claim 1, wherein receiving from the system controller on the vehicle the second predefined time comprises receiving from the system controller a time when the vehicle will come to a complete stop or a time when the collision between the vehicle and the one or more objects will be avoided.

11. The method of claim 1, wherein automatically activating simultaneously the friction braking system and the regenerative braking system when the operating speed of the vehicle exceeds a predetermined operating speed comprises automatically activating simultaneously the friction braking system and the regenerative braking system when the operating speed of the vehicle exceeds a speed that will avoid a collision.

12. A method for automatically activating simultaneously a friction braking system and a regenerative braking system of a vehicle, the method comprising the steps of:
  detecting a position and a movement of one or more objects in surroundings of a vehicle;
  detecting an operation of a brake pedal of the vehicle;
  calculating a risk of collision of the vehicle with the one or more objects based upon analyzing 2-dimensional or 3-dimensional vectors representing the velocity and direction of the vehicle and the one or more objects, the calculated risk of collision representing a probability that, based on the vector analysis, the vehicle and the one or more objects will reach a point in space at approximately the same time without an immediate intervention of the friction braking system and the regenerative braking system;
  in response to the brake pedal being operated with an operating speed exceeding a predetermined operating speed, or the calculated risk of collision exceeding a predetermined risk of collision, automatically activating simultaneously the friction braking system and the regenerative braking system of the vehicle;
  receiving, from a camera on the vehicle, a continuous video stream into buffer storage;
  receiving, from a sensor on the vehicle, a signal to transfer the continuous video stream from the buffer storage to a memory, wherein receiving from the sensor on the vehicle a signal to transfer the continuous video stream comprises receiving a signal that the regenerative braking system has been automatically activated;
  receiving, from a system controller on the vehicle, a first predefined time, the first predefined time indicating a time prior to the receiving of the signal to transfer in which to initiate a transfer of the continuous video stream from the buffer storage to the memory;
  receiving, from the system controller on the vehicle, a second predefined time, the second predefined time indicating a time after the receiving of the signal to transfer in which to stop the transfer of the continuous video stream from the buffer storage to the memory; and
  saving the continuous video stream in the memory.

13. The method of claim 12, wherein calculating the risk of collision of the vehicle with the one or more objects further comprises determining a rate of deceleration of the vehicle when using both the friction braking system and the regenerative braking system.

14. A system for automatically activating simultaneously a friction braking system and a regenerative braking system of a vehicle, the system comprising:
  a first sensor on the vehicle to detect a position and movement of one or more objects in surroundings of a vehicle;
  a second sensor on the vehicle to detect operation of a brake pedal of the vehicle;
  a regenerative braking system of the vehicle;
  a friction braking system of the vehicle;
  a system controller on the vehicle communicatively coupled to the first sensor, the second sensor, the regenerative braking system and the friction braking system, the system controller configured to calculate a risk of collision of the vehicle with the one or more objects based upon the position and the movement of the one or more objects, and in response to the brake pedal being operated with an operating speed exceeding a predetermined operating speed, or the calculated risk of collision exceeding a predetermined risk of collision, automatically activate simultaneously the friction braking system and the regenerative braking system of the vehicle;
  a camera on the vehicle communicatively coupled to the system controller and producing a continuous video stream;
  a buffer storage communicatively coupled to the camera and the system controller and storing the continuous video stream for a period of time; and
  a memory communicatively coupled to the camera, the buffer storage, and the system controller;
  the system further configured to:
    receive, from the camera, the continuous video stream into the buffer storage;
    receive, from at least one of the first and second sensors, a signal to transfer the continuous video stream from the buffer storage to the memory, wherein the signal to transfer the continuous video stream comprises a signal that the regenerative braking system has been automatically activated;
    receive, from the system controller, a first predefined time, the first predefined time indicating a time prior to the receiving of the signal to transfer in which to initiate a transfer of the continuous video stream from the buffer storage to the memory;
    receive, from the system controller, a second predefined time, the second predefined time indicating a time after the receiving of the signal to transfer in which to stop the transfer of the continuous video stream from the buffer storage to the memory; and save the continuous video stream in the memory.

15. The system of claim 14, wherein the calculated risk of collision represents a probability that a collision of the vehicle with the one or more objects is unavoidable without an immediate intervention of the friction braking system and the regenerative braking system.

16. The system of claim 14, wherein the continuous video stream saved in the memory comprises that portion of the video stream from the first predetermined time to the second predetermined time.

17. The system of claim 14, wherein the first sensor comprises one or more of a video sensor, a radar sensor, a lidar sensor, a sonar sensor, an ultrasound sensor, a microwave sensor, a light sensor, and a sound sensor.

\* \* \* \* \*